May 5, 1936.  R. R. SANDERSON  2,039,494

DRILL BIT

Filed July 30, 1932

INVENTOR
*Ray R. Sanderson*
BY *Evans & McCoy*
ATTORNEYS

Patented May 5, 1936

2,039,494

UNITED STATES PATENT OFFICE 2,039,494

DRILL BIT

Ray R. Sanderson, Orrville, Ohio

Application July 30, 1932, Serial No. 626,905

3 Claims. (Cl. 255—63)

This invention relates to an improved drill bit tip of the general character shown in my co-pending application Serial No. 614,866 filed June 2, 1932, and to an improved method of forming the same.

In the manufacture of drill bit tips of the general character shown in my co-pending application, it has been found that the tempering and hardening of these bit tips after they are machined and after the anchor stud sockets have been threaded, sometimes results in a warping of the drill bit tip so that the anchor stud sockets are no longer in parallel alinement, and this sometimes results in difficulty in assembling the drill bit tip with the drill bit blade.

It is believed that heretofore the grain of the metal in the cutting edge of drill bit tips has been made to extend longitudinally of the drill bit assembly, so that the ends of the grain of the steel have been substantially normal to the cutting edge of the drill bit. When drill bit tips are formed with the grain of the metal extending substantially normally to the cutting edge of the bit tip it is found that the cutting edge dulls so that the bit is unfit for use even when it has not lost its gauge dimension. I have found that if the drill bit tip is so formed as to have the grain of the metal in parallel arrangement with respect to the cutting edge of the bit that then the cutting edge of the bit is maintained for a much longer period, and the end grain of the metal, which is more resistant to abrasion than the side of the grain, maintains its gauge for a much longer period.

Drill bit tips formed in accordance with the present invention and having the grain of the metal extending parallel to the cutting edge of the drill bit carry a satisfactory cutting edge until after the drill bit tip has been worn out of gauge.

One of the objects of my present invention is to provide an improved form of drill bit tip of such character that the stud-receiving sockets may be threaded after the drill bit tip is hardened so that there will be no subsequent warping of the drill bit tip from any cause.

An additional object of the present invention is to provide a drill bit tip having a relatively soft, substantially non-tempering steel bushing for the anchor stud sockets formed in the drill bit tip, so that such anchor stud sockets may be accurately tapped after the body of the bit tip is hardened and tempered.

A further object is to provide means for rigidly and permanently mounting a non-hardening metal bushing within an anchor stud hold, which bushing is prevented from rotating and possibly binding of the anchor stud into the bushing, so that the drill bit tip subsequently can be separated easily from the drill bit blade even in those cases in which the bushings are somewhat eccentric.

Another object is to provide a drill bit tip of nickel file steel having anchor stud holes lined with mild steel or other non-hardening metal which is permanently and immovably bonded to the nickel file steel of the body of the drill bit tip.

Another object is to provide a drill bit tip of extreme hardness having anchor stud sockets that may be threaded or tapped subsequent to the hardening and tempering operation and after the impact face of the drill bit tip is ground to a plane surface and used as a locating face.

An additional object of the invention is to provide an improved method of forming a drill bit tip.

Another object of the invention is to provide a drop forged drill bit tip of extreme hardness in which the grain of the metal runs parallel to the cutting edge and impact face of the bit tip.

A further object of the invention is to provide a drill bit tip in which the grain of the metal runs in the direction of the cutting edge and is normal to the end gauge maintaining faces of the drill bit tip that are subjected to abrasive wear, whereby the cutting edge is maintained until after the drill tip wears out of gauge.

With the above and other objects in view, which will be apparent to those skilled in the art to which the present invention appertains, a suitable embodiment of the invention is shown in the accompanying drawing, in which.

Figure 1:
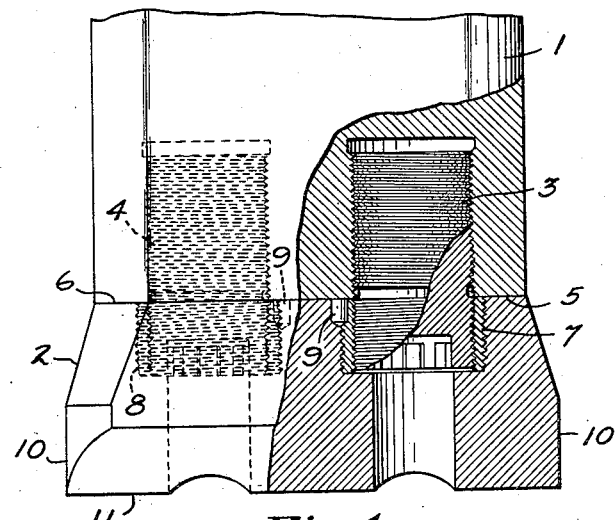
Figure 1 is a side elevational view, partly in section, of a drill bit tip in assembled relation with a drill bit blade.
Figure 3:
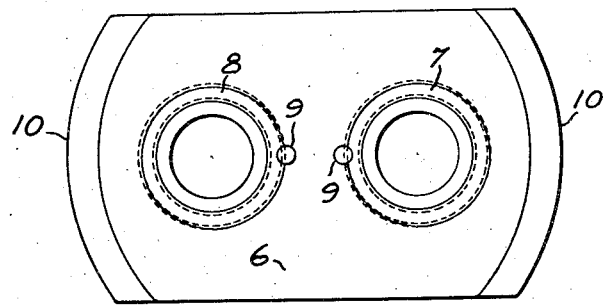
Fig. 3 is a plan view of a drill bit tip showing soft steel bushings secured in place.
Figure 4:
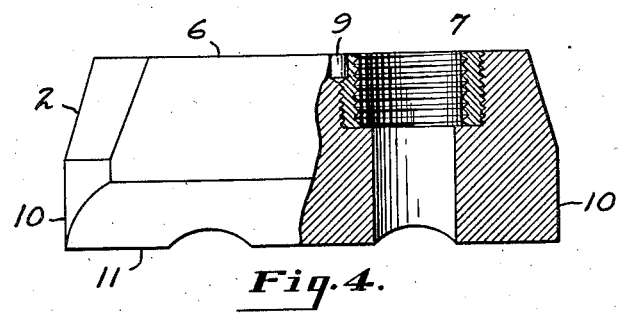
Fig. 4 is a side elevational view shown partly in section of a drill bit tip.
Figure 2:
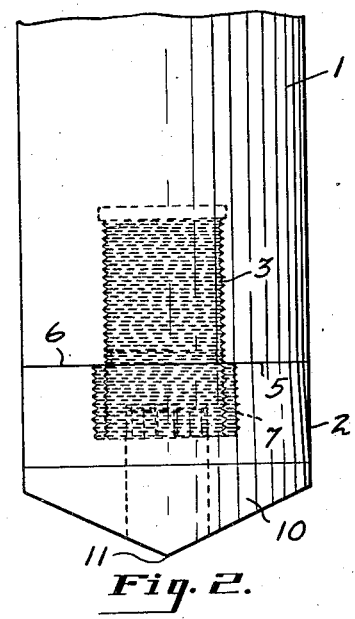
Fig. 2 is an end elevational view of an assembled drill bit blade and tip.

The drill bit assembly shown in Figs. 1 to 4 inclusive, comprises a drill bit blade 1 to which is rigidly secured a drill bit tip 2 by means of a pair of suitable anchor studs 3 and 4. The drill bit blade 1 is preferably formed of molybdenum steel or other hard and tough material and is provided with a flat, substantially plane impact face 5 which is of considerable area and is arranged normal to the axis of the drill bit blade. The impact face 5 is arranged for engagement with a correspondingly flat impact face 6 that is formed on the drill bit tip 2. The upper part of the drill bit blade is shown broken away because it is of the form shown in my co-pending application and further description of it is unnecessary to a full understanding of the present invention by those skilled in the art.

The drill bit tip 2 has a pair of anchor-receiving sockets which are lined with suitable mild steel sleeves 7 and 8. The socket in the drill bit tip 2 is first threaded in the same direction as the corresponding end of the anchor stud 3 or 4 to be received therein and the mild steel sleeve 7 or 8 is threaded into the socket formed in the body of the drill bit tip after the sleeve is treated with some corrosive material, such for example as a mixture of potassium chlorate and ammonium chloride. After the sleeve is rigidly threaded into the socket of the bit tip body it is preferably locked in place by a pin 9 that is driven into a drill hole formed between the threaded surface of the sleeve and the bit body. The pin 9 prevents rotation of the sleeve after the drill bit tip is completed. Any suitable means may be used for rigidly anchoring the sleeve in place. The threads on the outer and inner faces of the sleeves 7 and 8 are preferably of the same pitch and direction in order to provide the most rigid anchor for the anchor studs 3 and 4.

In the manufacture of drill bit tips embodying the invention, the metal for making the drill bit tip body is first rolled into a bloom of the general transverse sectional form of the finished drill bit tip. The rolled bloom is then cut into billets in which the roughly formed cutting edge of the billet extends longitudinally of the bloom. The billet is then forged to shape, so that the cutting face of the drill bit tip extends longitudinally of the grain of the metal, and so that the end faces 10 of the drill bit tip that determine the gauge of the hole in which the drill bit tip is used have the grain of the metal extending generally normal to the faces 10. The semi-finished drill bit tip with the sleeves 7 and 8 locked in place in the body of the bit tip, but not internally threaded for receiving the anchor studs 3 and 4, is then hardened by any suitable method that will produce deep hardening of the material of the bit body, and after the hardening is completed the impact face 6 of the drill bit tip is ground to finished form, so that any effect of warping of the impact face is removed. The impact face 6 may then be used as a locating face for accurately aligning and positioning the threaded sockets for receiving the anchor studs 3 and 4. Since the mild steel sleeves 7 and 8 are of softer steel than the remainder of the bit body, they will not be hardened to a degree that prevents the satisfactory threading of these sleeves in the manner described. The sleeves 7 and 8 may also be formed from any other suitable non-hardening metal.

The sockets for receiving the anchor studs 3 and 4 that are formed in the drill bit blade extend into the end of the drill bit blade, and, therefore, they do not have a tendency to warp out of alignment when the drill bit blade is hardened. For this reason the same problem is not presented with respect to the drill bit blade as is presented with respect to the drill bit tip.

After the drill bit tip is formed in the manner described, it is removably connected with the drill bit blade by the anchor studs 3 and 4 in the manner described in my co-pending application that is above referred to.

In drill bit tips made in accordance with this invention, both the gauge-maintaining faces 10 of the ends of the bit and the cutting edge 11 of the drill bit tip in normal use wear at a rate such that the bit loses its cutting edge at about the same time that it loses its gauge, and, therefore, it remains in effective service much longer than a bit tip that has the grain of the metal extending normal to the cutting edge 11 in which the cutting edge flattens down and loses its effectiveness before the drill bit tip loses its gauge.

In drill bit tips made in accordance with this invention the mild steel sleeves 7 and 8 may be split and removed from the sockets in the bit body after the bit tip is badly worn. The bit tip may then be reforged to again bring it to desired working dimensions and equipped with new non-tempering steel bushings 7 and 8 in the manner described in connection with the original manufacture of the drill bit tip, so that the ultimate life of the bit tip is greatly extended.

During operation of the drill assembly, the impact somewhat compresses the metal of the bit tip and the bit blade in which the securing stud is positioned. The softer metal of the sleeve acts as a cushion between the hard metal of the drill assembly and the anchor stud so that the threads of the anchor stud are protected from the shearing action of the harder steel parts during severe service. This sleeve also removes some of the strains from the portion of the stud, carried in the bit blade so that a corresponding soft metal sleeve is usually not necessary in the bit blade, although sometimes it is desirable to also use a soft metal sleeve of the character proposed in the bit blade.

It is to be understood that the particular embodiments of the present invention shown and described are presented for purposes of explanation and illustration and that various modifications, including the type of tool to which the procedure is applied, may be made without departing from the invention as defined in the appended claims.

What I claim is:

1. A drill bit tip, comprising a body portion of hard tempering steel having anchor-receiving sockets therein, and mild steel bushings rigidly secured in said sockets and internally threaded for receiving threaded anchor studs.

2. A drill bit tip having a bottom cutting edge substantially normal to its axis and a top impact face arranged parallel to the cutting edge wherein the grain of the metal of the drill bit tip extends substantially parallel with the cutting edge and impact face of the drill bit tip.

3. A drill bit tip adapted to be secured to the lower impact transmitting face of a drill bit blade comprising a body portion of hard tempering steel which has an upper impact receiving face and a threaded anchoring socket opening to said upper face, a mild steel bushing which is externally threaded to screw into said socket and internally threaded to receive an anchoring stud, said bushing being of a length corresponding to the depth of the socket, and longitudinal key engaging slots in the bushing and body portion which register when the bushing is in engagement with the bottom of the socket.

RAY R. SANDERSON.